United States Patent [19]

Allen et al.

[11] Patent Number: 4,546,991

[45] Date of Patent: Oct. 15, 1985

[54] ADJUSTABLE SEAT FOR A TRICYCLE

[75] Inventors: David A. Allen; Robert L. Diekman, both of Centerville, Ohio

[73] Assignee: Huffy Corporation, Miamisburg, Ohio

[21] Appl. No.: 603,870

[22] Filed: Apr. 25, 1984

[51] Int. Cl.$^4$ ............................................. B62K 9/02
[52] U.S. Cl. ................................ 280/282; 280/278; 297/195; 297/346
[58] Field of Search ........... 280/282, 278, 274, 281 R, 280/7.1, 7.15, 270, 62, 220, 281 W; D12/112, 119; 297/DIG. 9, 195, 196, 345, 346, 338, 243; 248/419, 420; 296/65 R

[56] References Cited

U.S. PATENT DOCUMENTS

| | | | |
|---|---|---|---|
| 690,733 | 1/1902 | Jarvis | 280/281 W |
| 1,326,468 | 12/1919 | Shearer | 280/287 |
| 1,574,999 | 3/1926 | Pfeifer | 280/282 |
| 2,724,599 | 11/1955 | Knapp | 280/62 |
| 4,141,587 | 2/1979 | Holcomb | 297/DIG. 9 |
| 4,254,991 | 3/1981 | Venieris | 297/345 |

FOREIGN PATENT DOCUMENTS

| | | | |
|---|---|---|---|
| 1012689 | 7/1952 | France | 280/282 |
| 1428565 | 1/1966 | France | 280/282 |
| 110686 | 5/1944 | Sweden | 297/346 |
| 6748 | of 1896 | United Kingdom | 280/281 W |

Primary Examiner—Joseph F. Peters, Jr.
Assistant Examiner—Mark C. Dukes
Attorney, Agent, or Firm—Biebel, French & Nauman

[57] ABSTRACT

A tricycle which is capable of being converted either to a traditional high position in which a rider is seated relatively high on the frame, or to a low slung position in which the frame is inverted so that a rider is seated relatively low on the frame. To invert the frame, a front fork and handlebar are removable from the head tube of the tricycle and invertible relative to the frame and the seat is adjustable between a high and low position corresponding to the high and low slung tricycle positions. A rear deck is attached to a rear portion of the main tube and is tubular in shape so that it fully protects and encloses the rear axle of the tricycle in both the high and the low frame positions. A seat is mounted on the frame and is capable of forward and rearward adjustment as well as upward and downward adjustment. A dumpster is pivotally attachable to the frame adjacent the rear deck and includes notches that form an easily releasable snap fit with the rear axle of the tricycle, and a channel formed in a front wall shaped to form a releasable snap fit with the rear portion of the main tube. The rear deck and pedals of the tricycle include upwardly extending flanges to prevent the feet of a rider on the tricycle from sliding sidewardly to contact the rear wheels, pedal crank supporting the pedals, or the front wheel.

8 Claims, 21 Drawing Figures

ADJUSTABLE SEAT FOR A TRICYCLE

BACKGROUND OF THE INVENTION

The present invention relates to tricycles and, more particularly, to tricycles adapted for use exclusively by children.

The traditional child's tricycle includes a frame having a head tube which pivotally supports a front fork assembly, a rear deck which is attached to a pair of rear wheels, and a main tube extending between the head tube and rear deck. The front fork assembly includes a fork member having a pair of opposing legs that rotatably support a front wheel, and a shaft extending upwardly from the fork legs through the head tube. The fork assembly also includes handlebars having a stem extending downwardly into the head tube and telescoping within the shaft of the fork member. An upper end of the shaft protrudes above the top of the head tube, and the handlebar stem is secured to the fork shaft by a collar which encloses the top portion of the shaft at the top of the head tube and includes a set screw which is threaded inwardly to clamp the handlebar stem against the top of the fork shaft.

The main tube of such a tricycle typically is a length of tubing bent to form a front portion and a rear portion oriented at an obtuse angle with the front portion. The front portion includes a vertically extending hole which receives a seat post of a tricycle seat. The seat post is secured to the main tube by a set screw which is threaded through a transverse hole to contact the side of the seat post within the main tube. The front portion is inclined slightly downwardly from the head tube, so that the seat is in a relatively high position on the tricycle.

The rear deck typically is in the form of an inverted, U-shaped channel which is welded to the rear portion of the main tube at its midpoint. An axle rod is journaled into the rear deck and is attached at its ends to the rear wheels.

The front wheel includes a pedal crank whose ends extend sidewardly from the wheel. A pair of pedals are rotatably mounted on the ends of the pedal crank. Typically, the pedals include an opposing pair of substantially flat, foot-supporting surfaces with a raised tread to prevent the feet of a rider from sliding off of the pedals. Similarly, the rear deck includes a substantially flat foot-supporting surface which includes fluting or a raised tread to prevent the feet of a rider standing upon the rear deck from sliding outwardly against the rear wheels or rearwardly off of the rear deck.

Another type of tricycle in wide use has a frame which is relatively low slug when compared to the aforementioned traditional frame shape. In contrast to the main tube of the traditional tricycle, the main tube of this type of tricycle includes a forward portion inclined sharply downwardly from the head tube, and a rearward portion oriented substantially horizontally and at a level with the rear wheels. The head tube is angled from the vertical more severely than its counterpart in the traditional tricycle so that the front wheel is positioned well in front of the head tube and the handlebars extend rearwardly of the head tube.

The seat of the low slung tricycle is mounted on the rearward portion and, therefore, is low relative to the pedals of the front wheel. Consequently, the feet of a rider are on approximately the same level as the seat of the rider, so that the seat of the low slung tricycle must include an upwardly extending back to support the rider and prevent him from sliding rearwardly as he pedals.

There are several disadvantages common to both styles of tricycle. For example, the seat of the low slung tricycle typically is adjustable only forwardly and rearwardly; there is no provision for elevating the seat relative to the frame on which it is mounted to bring a rider closer to the handlebars. Similarly, the seat of the traditional tricycle typically is capable of being adjusted only upwardly and downwardly; there is no structure to allow forward and rearward adjustment of the seat relative to the main tube on which it is mounted to position the seat a distance from the pedals which is comfortable for a rider.

In addition, the pedals of the low slung tricycle typically are similarly to those used with the traditional tricycle in that they include opposing, flat foot-supporting surfaces having a tread to prevent slippage of the feet of a rider from the pedal. Accordingly, there is no structure which positively prevents the feet of a rider from sliding inwardly to engage the pedal cranks or the front wheels of either type of tricycle.

Another disadvantage with both styles of tricycle is that one type of tricycle cannot be readily and easily converted into the other. Therefore, in order to provide a child with both types of tricycle, two separate tricycles must be purchased; the traditional-style tricycle and the low slung version.

With regard to optional features, neither type of tricycle is used with a load-carrying receptacle adapted to be mounted on the rear deck. While the traditional-style style tricycles often include baskets which are strapped to the handlebars, the low slung tricycle typically does not provide for any type of article-carrying receptacle. Furthermore, neither style provides for an article-carrying receptacle adapted to be attached rearwardly of the tricycle seat.

Accordingly, there is a need for a tricycle which may be readily and easily adjusted to a traditional high position or a low slung position. Furthermore, there is a need for providing a pedal and rear deck design for a tricycle which ensures that the feet of a rider do not slide off of the pedals or deck and against the wheels of the tricycle. Another desirable development needed for tricycles is a seat design which can be adjusted upwardly and downwardly as well as forwardly and rearwardly relative to the main tube on which it is mounted to accommodate a greater variety of rider sizes. And finally, there is a need for an article-carrying receptacle which is shaped to attach to the rear portion of a tricycle.

SUMMARY OF THE INVENTION

The present invention is a tricycle which is capable of being converted either to a traditional style, in which a rider is seated relatively high on the main tube and relatively close to the handlebar, or to a low slung style, in which a rider is seated relatively low on the main tube and relatively close to the rear wheels. The tricycle includes a head tube, a front fork assembly pivotally attached to the head tube and having a handlebar and a fork member supporting a front wheel, a main tube extending rearwardly from the head tube, a seat adjustably mounted on the main tube, and a rear deck attached to a rear portion of the main tube and having a pair of rear wheels.

The method is the same for converting the tricycle from either style to the other. The front fork assembly is removed from the head tube and the seat is removed from the main tube. The frame, consisting of the main tube and head tube, is then pivoted about the axle at the rear deck until it is inverted relative to its previous position. The front fork assembly is then reattached to the head tube and the seat reattached to the main tube.

When the tricycle is converted in this manner to the high position, the seat is attached to the main tube at a high, forward location adjacent to the head tube. When the tricycle is converted to the low slung position, the seat is attached to the main tube at a low, rearward location adjacent to the rear wheels. It is this capability of positioning the seat in a forward and in a rearward position on the frame that enables the tricycle of the present invention to be converted to the high or low slung positions such that a significant change in seat elevation occurs. A prior art tricycle, regardless of the configuration of its main tube, cannot provide the same dramatic change in appearance and seat elevation merely by inverting the tricycle frame and reattaching the seat to the frame at the same general location on the main tube.

In a preferred embodiment, the main tube includes a front segment and a rear segment bent to form an obtuse angle. The front segment is adapted to support the seat when the frame is in the high position, and the rear segment is adapted to support the seat on an opposite side of the main tube when the frame is inverted to the low slung position. It is especially preferable to form the main tube such that the aforementioned angle is between 147° and 152°, with 150° being optimal. It is also preferable to form the handlebar such that the yoke portion, which includes the handlebar grips, is oriented at an angle to the handlebar stem of between 0° and 5°, and to attach the head tube, which supports the fork assembly to the main tube at an angle of approximately 78°. With the frame and fork assembly formed in this manner, the handlebar grips and pedals are within a comfortable reach of a seated child rider for both high and low tricycle positions.

Also in the preferred embodiment, the rear deck is tubular in shape and completely encloses the rear axle supporting the rear wheels. This prevents a rider from contacting the axle when the frame is in the high position and when it is adjusted to the low slung position.

Another advantage of the tricycle of the present invention is that it includes a seat which is adjustable relative to the main tube in forward and rearward directions as well as in upward and downward directions, thereby providing a capability to seat comfortably riders of a greater size range than prior art tricycles. The adjustable seat consists of a seat body having a substantially flat seating surface, a seat bracket attached to the seat body, and a mounting bracket attached to the seat bracket and adapted to be attached to the main tube of the tricycle. The seat bracket includes a leg portion which is inclined upwardly relative to the seating surface. The mounting bracket includes a front member shaped to attach to the main tube of the tricycle and a rear member which is inclined relative to the front member and is adapted to matingly engage the leg portion of the seat bracket.

In the preferred embodiment, the front member includes a plurality of holes which are sized to receive a mounting bolt that passes through a similarly shaped hole in the main tube. Selection of one of the front member holes determines the relative position between the seat and the main tube, so that the seat may be moved forwardly or rearwardly relative to the main tube depending upon the selection of the mounting bracket hole. The rear member is channel-shaped and includes a plurality of transverse slots. The leg portion of the seat bracket is also channel-shaped and includes a plurality of corresponding holes. The height of the seat can be adjusted by sliding the leg portion relative to the rear member of the mounting bracket, then securing the two together by a nut and bolt combination passing through ones of the holes and slots in registry.

Another advantage of the tricycle is that the rear deck and pedals include structure for preventing the feet of a rider from sliding sidewardly into the front and rear wheels of the tricycle. The rear deck includes a pair of end pieces attached to its opposing ends and positioned adjacent the inboard sides of the rear wheels. The end pieces include flanges extending upwardly from the rear deck sufficiently to prevent the feet of a rider standing on the rear deck from inadvertently sliding outwardly to contact the rear wheels.

The pedals of the tricycle include a body portion rotatably attached to the ends of the pedal crank of the front wheel. Each pedal includes a pair of opposing, foot-supporting surfaces. The body portion of each pedal includes a flange adjacent an inboard side which extends outwardly from and substantially perpendicularly to the foot-supporting surfaces a distance sufficient to prevent the foot of a rider from sliding inwardly to contact the wheel. Preferably, the flanges are integral with the body portion, and the entire pedal preferable is molded of a high density polypropylene material.

In an alternate embodiment of the invention, the tricycle includes a dumpster attachment which is an article-carrying receptacle adapted to be mounted on the rear portion of the tricycle. The dumpster includes a pair of side walls, each having a notch at its lower end, and a pair of opposing tabs extending into the notch so that the tabs and notch form a snap fit with the portion of the axle extending between the rear deck and rear wheels of the tricycle. The front wall of the dumpster includes a channel at its midportion which angles upwardly from the floor of the dumpster and is shaped to matingly engage a rear portion of the main tube of the tricycle. The channel includes a pair of opposing projections which extend into the channel so that the channel and projections form a snap fit with the main tube.

The dumpster is mounted easily on the tricycle by snap fitting the rear axle of the tricycle into the notches on the side walls and snap fitting the main tube into the channel on the front wall of the dumpster. The dumpster may be removed from the tricycle merely by applying an upward force on the dumpster of sufficient force to break the snap fit engagement with the tricycle to which it is attached, while holding the tricycle in place. The dumpster can be pivoted from a load-carrying position, in which the floor of the dumpster is substantially level, to a dumping position in which the floor is tilted upwardly relative to the horizontal, by pivoting the dumpster about the rear axle of the tricycle.

Preferably, the notches on the side walls are positioned rearwardly of the center of gravity of the dumpster so that the dumpster tends to pivot forwardly against the main tube when mounted on the rear axle. By positioning the notches rearwardly of the center of gravity, the likelihood of the dumpster inadvertently pivoting to a dumping position is substantially reduced.

Accordingly, it is an object of the present invention to provide a tricycle which is capable of being converted to a traditional high position or to a low slung position with a minimum of effort and time; a tricycle having a seat which is adjustable forwardly and rearwardly as well as upwardly and downwardly so that the tricycle accommodates comfortably riders of a greater range in size; a tricycle having structure attached to the pedals and rear deck to prevent the inadvertent sideward sliding of the feet of a rider into the front and rear wheels; and a tricycle having a dumpster which is adapted to be removably mounted on the rear portion of the tricycle and is capable of being pivoted from a load-carrying position to a dumping position.

Other objects and advantages of the invention will be apparent from the following description, the accompanying drawings and the appended claims.

DETAILED DESCRIPTION OF THE PREFERRED EMBODIMENTS

Figures 1, 4:
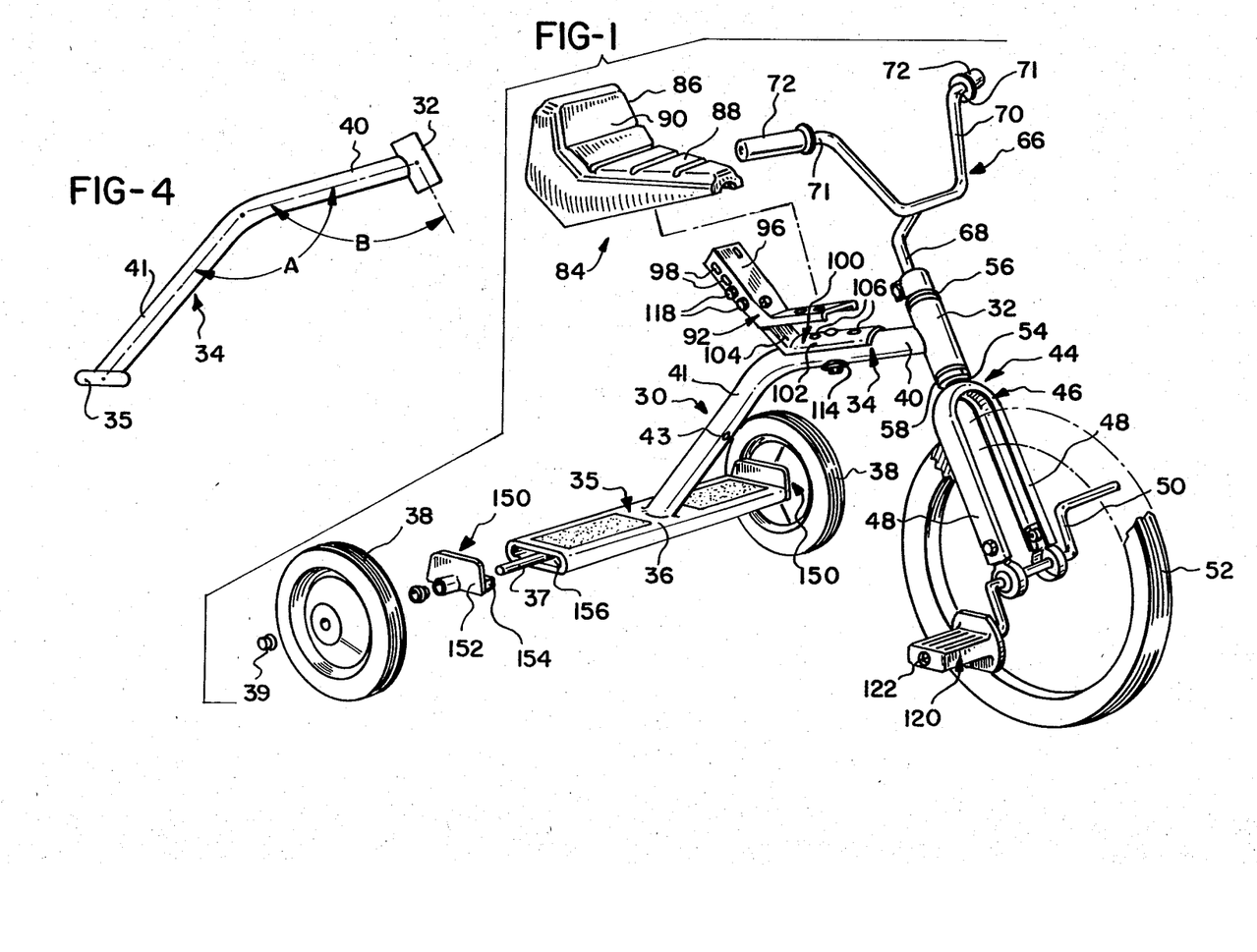
FIG. 1 is a perspective, exploded view of a preferred embodiment of the tricycle of the present invention.
FIG. 4 is a detail showing the frame of the tricycle of FIG. 1.
Figure 2:
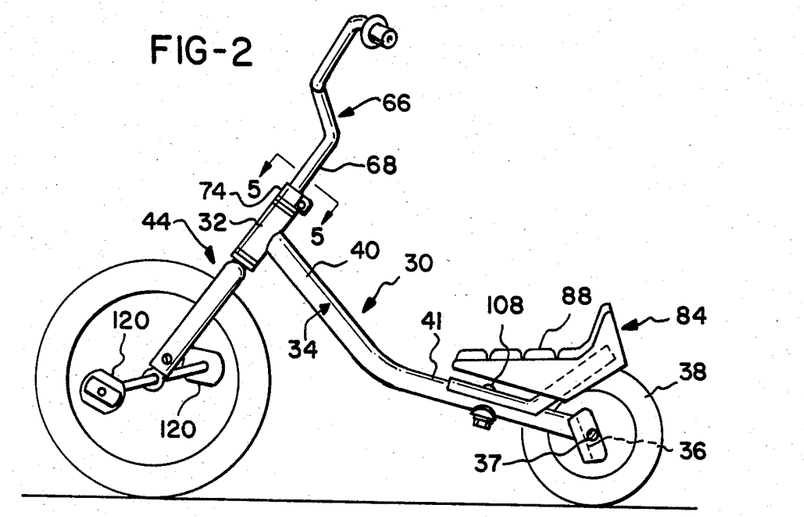
FIG. 2 is a side elevation of the tricycle of FIG. 1 shown adjusted to a low slung position.
Figure 3:
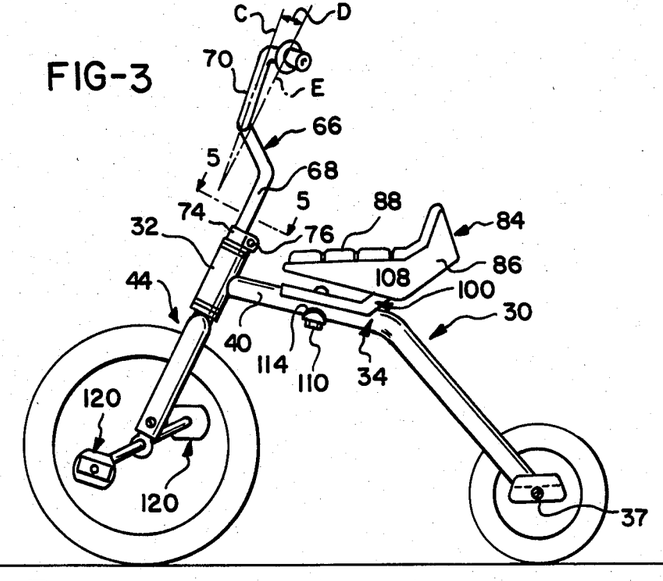
FIG. 3 is a side elevation of the tricycle of FIG. 1 adjusted to a high position.

As shown in FIGS. 1, 2 and 3, the tricycle of the present invention includes a frame, generally designated 30, consisting of a head tube 32, a main tube 34, and a rear deck 35. The head tube 32 and main tube 34 are both made of tubular steel and are connected to each other by welding. The rear deck 35 is also made of tubular steel and is joined to the main tube 34 by welding.

The rear deck 35 is substantially oval in cross section and includes a substantially flat, foot-supporting surface 36 on its upper side. A rear axle 37 extends through the rear deck 35 and is rotatably attached to rear wheels 38. Rear wheels 38 are held on the axle by nuts 39 (only one of which is shown).

The main tube 34 includes a front segment 40 and a rear segment 41. The front segment 40 and rear segment 41 are oriented at an obtuse angle. Front segment 40 and rear segment 41 include seat mounting holes 42, 43, respectively (see also FIG. 11).

A front fork assembly, generally designated 44, is pivotally attached to the head tube 32. The front fork assembly 44 includes a fork member 46 having a pair of opposing legs 48 to which a pedal crank 50 is rotatably attached. The pedal crank 50 is fixedly attached to a front wheel 52. The structures of the fork legs 48, pedal crank 50 and front wheel 52 are well-known in the art and are typical of high quality tricycles.

Figures 5, 6:
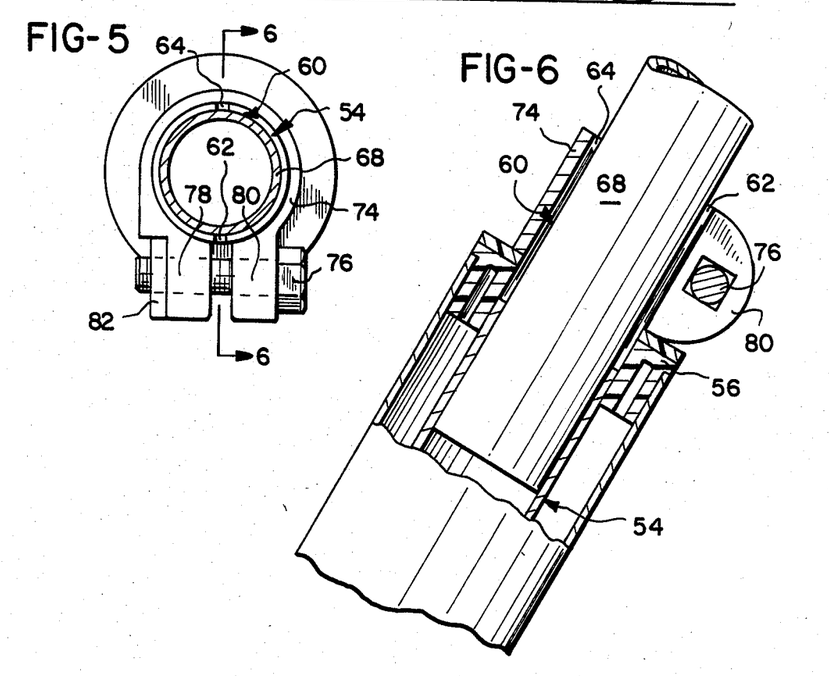
FIG. 5 is a detail taken at 5—5 of FIGS. 2 and 3 showing a section through the handlebar stem.
FIG. 6 is a detail of the fork assembly taken at line 6—6 of FIG. 5.
Figure 7:
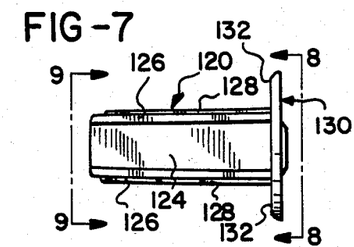
FIG. 7 is a side elevation of a pedal of the tricycle shown in FIG. 1.

As shown in FIGS. 5 and 6, the fork member 46 includes a shaft 54 which is attached to the fork legs 48 and extends upwardly through the head tube 32. The shaft 54 is held in position relative to the head tube 32 by upper and lower journal bearings 56, 58, respectively, (see also FIG. 1), which are inserted in the ends of the head tube. The shaft 54 includes an upper end 60 which protrudes upwardly from the head tube 32 through journal bearing 56 and is split into two sections by opposing slots 62, 64.

A handlebar 66 includes a downwardly extending, tubular stem 68 and a U-shaped yoke portion 70. The yoke 70 extends generally upwardly from the head tube 32 and includes ends 71 extending generally outwardly. Handle bar grips 72 are attached to the ends 71 of the yoke portion 70. The handlebar stem 68 extends downwardly from the yoke 70 and is sized to telescope into the upper end 60 of the shaft 54. A U-shaped clamp 74 is mounted on the upper end 60 and includes a bolt 76 which extends through its ends 78, 80 and is secured therein by a nut 82.

By tightening the nut and bolt 76, 82, respectively, the clamp 74 compresses the split upper end 60 of the shaft 54 against the handlebar stem 68. Conversely, loosening the nut and bolt 76, 82 releases the upper end from the handlebar stem so that the two elements may be separated from each other and rearward from the head tube 32.

Figure 11:
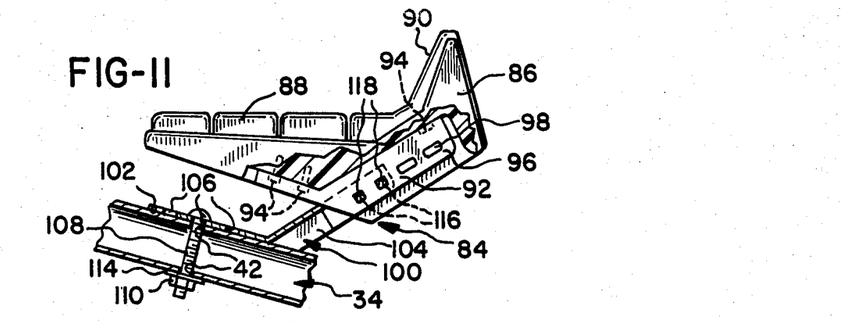
FIG. 11 is a detail showing the seat of the tricycle of FIG. 1 in which the seat body is partially broken away.

The tricycle includes a seat, generally designated 84, best shown in FIGS. 1 and 11. The seat includes a seat body 86 having a padded, substantially horizontally-oriented seating surface 88 and an upwardly inclined rear back 90. The seat bracket 92 is attached to the underside of the seat body 86 by screws 94 and includes a leg portion 96 which is inclined rearwardly and upwardly relative to the seating surface 88. The leg portion 96 is channel-shaped and includes transverse slots 98.

A mounting bracket 100 having a front member 102 and a rear member 104. The front member 102 includes a plurality of holes 106, and the mounting bracket is attached to the main tube 34 by a nut and bolt 108, 110, respectively, which pass through a selected one of the holes and through the vertically oriented hole 42 in the main tube. A contoured washer 114 is positioned between the nut 110 and underside of the main tube 34. (See also FIG. 3.)

The rear member 104 of the mounting bracket 100 is inclined upwardly relative to the front member 102 and is channel shaped to slide within the channel-shape of the leg portions 96. Rear member 104 includes two pairs of transverse holes 116 which are positioned to be moved into registry with selected ones of the slots 98 of the leg portion 96. Nut and bolt combinations 118 extend through the slots 98 and holes 116 of the leg portion 96 and rear member 104, respectively.

The seat 84 has the capability of being adjusted forwardly or rearwardly on the main tube 34 by positioning a selected one of the holes 106 in registry with the corresponding hole 42 in the main tube, then attaching the mounting bracket 100 to the main tube by the nut and bolt 108, 110, respectively. In addition, the seat 84 has the capability of being adjusted vertically by sliding the leg portion 96 of the seat bracket 92 along the rear member 104 of the mounting bracket 100 so that the holes 116 of the rear member are in registry with selected ones of the slots 98 of the leg portion. The leg portion is then attached securely to the rear member 104 by nuts and bolts 118. The rear member 104 and leg portion 96 are both inclined relatively to the slope of the main tube 34 so that the seating surface 88 remains substantially horizontal regardless of the seat elevation, and regardless of the forward or rearward position of the seat 86 relative to the main tube.

As shown in FIGS. 1, 7-10 and 14, a pair of pedals 120 are rotatably attached to the ends of the pedal crank 50 (only one pedal 120 being shown on an end of the pedal crank 50 in FIG. 1) and are secured on the ends by nuts 122. Each pedal 120 includes a substantially rectangular pedal body 124 having opposing, foot-supporting surfaces 126. The surfaces 126 include transverse ridges 128 forming a tread to minimize slippage of the foot of a rider from the pedal.

The pedals each include a flange 130 which is formed integrally with the pedal body 124 and is positioned adjacent an inboard end of the pedal 120. The flange 130 includes a pair of opposing wings 132 which extend outwardly from and are oriented substantially perpendicularly to the foot-supporting surfaces 126.

Figure 8:
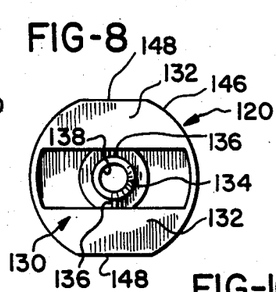
FIG. 8 is an inboard end view of the pedal of FIG. 7, taken at line 8—8 of FIG. 7.
Figure 9:
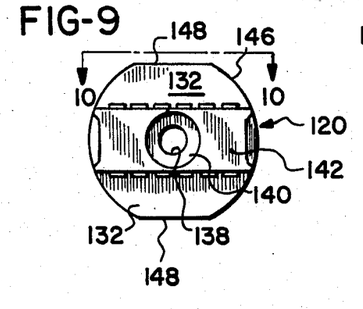
FIG. 9 is an outboard end view of the pedal taken at line 9—9 of FIG. 7.
Figure 10:
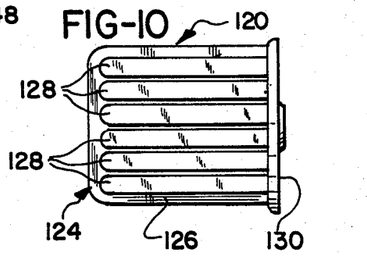
FIG. 10 is a plan view of the pedal taken at line 10—10 of FIG. 9.
Figure 14:
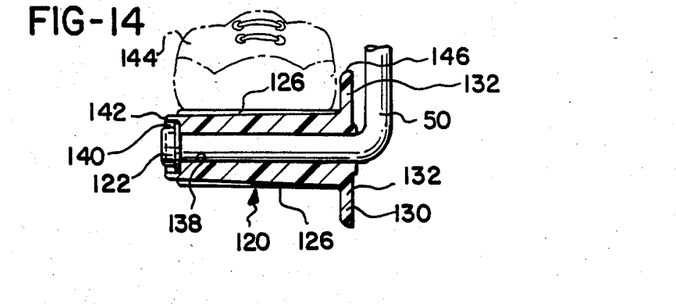
FIG. 14 is a detail showing the pedal of FIG. 7 in section and attached to a pedal crank, and in which a foot of a rider is shown in phantom.

As best shown in FIGS. 8 and 14, the pedal body 124 is substantially hollow and includes a central tube 134 which is formed integrally with the body and flange 130, and is connected thereto by webs 136. The tube 134 includes a bore 138 sized to receive the end of the pedal crank 50. The end of the pedal crank 50 protrudes through the bore and into a recess 140 formed in the outboard end 142 of the pedal body 124 (see also FIG. 9). The recess 140 protects the nut 122 which retains the pedal 120 on the crank 50.

As best shown in FIG. 14, the wings 132 of the pedal 120 extend upwardly from the supporting surfaces 126 a distance sufficient to prevent the foot 144 of a rider on the tricycle from sliding inwardly to contact either the pedal crank 50, fork leg 48 or wheel 52 of the tricycle. Although flanges of sizes and shapes different from that shown may be employed, the shape of flange 130 is preferred because the arcuate outer surface 146 of the flange is lacking in sharp edges which might injure a rider. The exact distance from the foot supporting surface 26 to the outer edge 148 of the wings 132, while not critical, should be at least 0.5 inches (1.27 cm).

Figure 12:
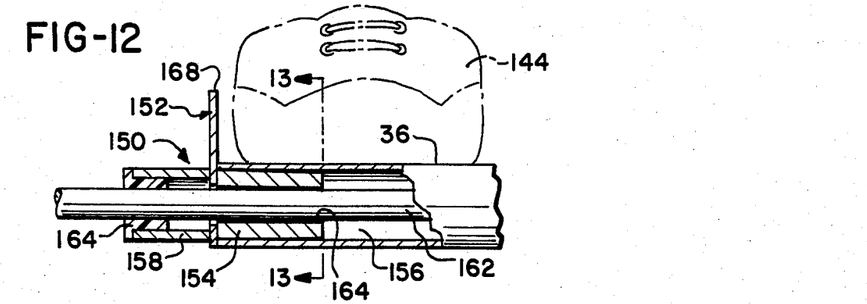
FIG. 12 is a detail showing the rear deck of the tricycle in which a portion of the rear deck is shown in section and a foot of a rider in shown in phantom.
Figure 13:
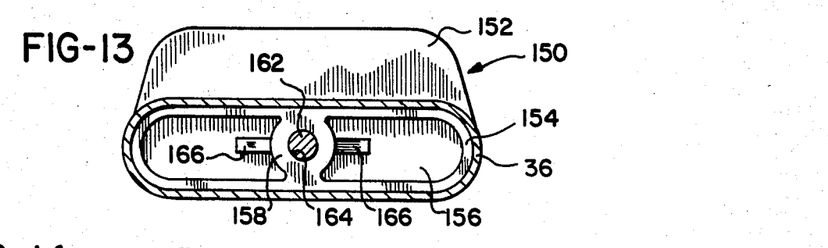
FIG. 13 is a detail showing the rear deck in section taken at line 13—13 of FIG. 12.

A similar feature has been incorporated into the design of the rear deck 35. As shown in FIGS. 1, 12 and 13, the rear deck 35 includes a pair of end pieces 150 having upwardly extending flange plates 152. Each end piece 150 includes a tubular section 154 which is shaped to telescope into the open end 156 of the rear deck, and is secured thereto by welding.

Each end piece 150 includes a shaft 158 which extends through the flange plate 152 and tubular section 154. The shaft forms an opening 160 sized to receive the rear axle 37 of the tricycle. A nylon journal bearing 164 is fitted onto the outboard end of the shaft 158 and supports the axle 37. The shaft 158 is stabilized relative to the flange plate 152 by gussets 166 which extend between the shaft and flange plate.

As shown in FIG. 12, the flange plate 152 extends above the foot supporting surface 36 of the rear deck 35 a distance sufficient to prevent the foot 144 of a rider from sliding outwardly against the rear wheels 38 of the tricycle. Again, the distance from the foot supporting surface 36 to the top surface 168 is not critical, but should be no less than 0.5 inches (1.27 cm).

The aforementioned tricycle can be converted from a traditional, high position, shown in FIG. 3, to a low slung position as shown in FIG. 2. It should be noted that, when the tricycle is in the high position, the seat 84 is mounted on the front segment 40 of the main tube 34 so that the bolt 108 passes through hole 42 (see FIG. 11). As described previously, the seat body 86 may be adjusted both forwardly and rearwardly, and upwardly and downwardly relative to the front segment 40 in order to adjust the distance from the seating surface 88 to the pedals 120 in order to accommodate riders of varying sizes.

To convert the tricycle from the high position to the low position, the bolt 76 is loosened on the clamp 74 and the handlebar 66 is removed from its telescoping engagement with the upper end 60 of the fork shaft 54. The clamp 74 is removed from the shaft 54 and the fork member 46 removed from the head tube 32.

The seat 84 is removed from the main tube 34 by removing the nut and bolt 108, 110, respectively, from the mounting bracket 100 and front segment 40 of the main tube. The main tube 34 is then pivoted about the rear axle 37 of the tricycle until it assumes the position shown in FIG. 2.

The main tube 34 is now in a position which is inverted relative to its high position shown in FIG. 3. The shaft 54 of the fork member 44 is reinserted into the head tube 32, and the stem 68 of the handlebar 66 reattached to the shaft by the clamp 74 in the manner previously described. The seat 84 is attached to the rear segment 41 of the main tube 34 by inserting bolt 108 through the hole 43 in the rear segment (see FIG. 1).

The tricycle is now in a low slung position so that the seating surface 88 is at a level approximately equal to the rear wheels 38. Again, the seat 84 can be adjusted in elevation and in its forward and rearward orientation relative to the main tube 34 in order to vary the distance from the seating surface 88 to the pedals 120 to accommodate a rider. Of course, the elevation of the handlebar 66 relative to the head tube 32 may be varied when the tricycle is in the high or low position to position the grips 72 conveniently for a rider.

The procedure for converting the tricycle from the low slung position FIG. 2 back to the high position in FIG. 3 is substantially the same as the method previously described. The seat 84 is removed from the rear segment of the main tube 34, and the fork member 44 and handlebar 66 removed from the head tube 32. The frame 30 is then pivoted about the rear axle 37 of the tricycle until it assumes the orientation shown in FIG. 3. The fork member 44 and handlebar 66 are then reattached to the head tube 32, and the seat 86 reattached to the front segment 40 of the main tube 34.

Another advantage of the tricycle frame 30 over prior art designs is that the rear deck 35 totally encloses the axle 37 extending through it. This serves not only to strengthen the rear deck 35, but protects the axle 37 when the frame 30 is in the low slung position and the surface 36 underneath the deck.

In order to provide a tricycle frame 30 in which the distance from the seating surface 88 to the pedals 120 is appropriate and comfortable for a child rider in both the high and low tricycle positions, it is preferable that the main tube 34 comprise front and rear segments 40, 41, respectively, which form an angle A of between approximately 147° and 152° (see FIG. 4). It has been found especially preferable to provide a main tube 34 in which the front and rear segments 40, 41 form an angle A of 150°.

Furthermore, in order to position the handlebar 66 such that the grips 72 are at an appropriate distance from the seating surface 88 when the tricycle is in both the high and low slung positions, it is preferable to connect the head tube 32 to the front segment 40 to form an angle B of approximately 78°. It is also preferable to form the handlebar 66 such that a centerline C of the yoke 70 forms an angle D with a centerline E of the stem 68 of between approximately 0° and 5°, as shown in FIG. 3.

In general, it is desirable to position the yoke 70 on the stem 68 such that the yoke extends generally upwardly and the ends 71 of the yoke (covered by grips 72 in FIG. 1) extend generally outwardly when the tricycle is in the high or low slung configuration. This handlebar shape minimizes the likelihood that the ends 71 of the yoke 70 will contact a rider when the tricycle is in the high or the low slung positions.

Another embodiment of the tricycle is shown in FIGS. 15–21 and includes a dumpster 170. The dumpster 170 preferably is of single piece, molded construction and includes side walls 172, 174, a front wall 176, rear wall 178 and floor 100.

Figure 19:
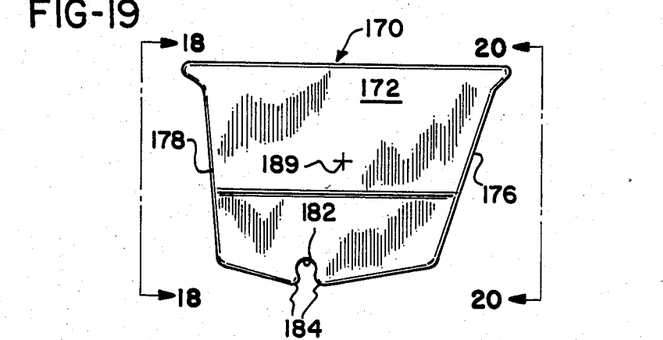
FIG. 19 is a side elevation of the dumpster of FIG. 15.
Figure 20:
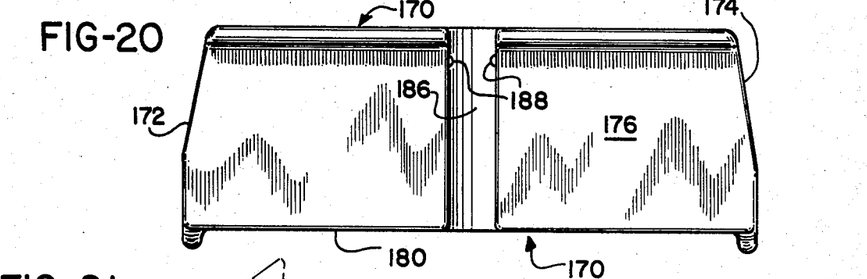
FIG. 20 is a front elevation of the dumpster of FIG. 15, taken at line 20—20 of FIG. 19.
Figure 21:
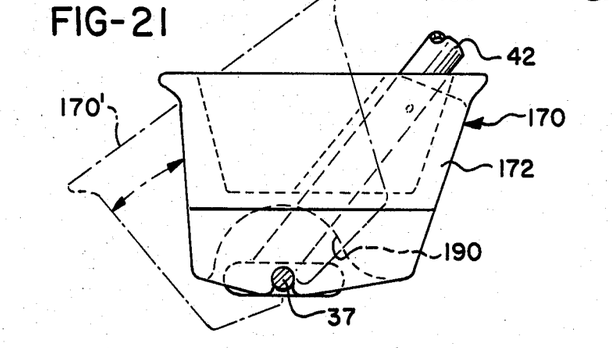
FIG. 21 is a detail showing the dumpster of FIG. 15 in a load-carrying position and, in phantom, pivoted to a dumping position.

As shown in FIGS. 19, 20 and 21, the side walls 172, 174 include notches 182 formed in their lower ends, and partially enclosed by tabs 184. The tabs 184 are shaped so that the notches 182 receive the rear axle 37 of the tricycle in a snap fit. The side walls 172, 174 are spaced apart such that the notches 182 engage the axle 37 between the end pieces 150 of the rear deck and the rear wheels 38. With the tricycle shown in FIG. 1, the notches 182 could also be sized and spaced apart to form a snap fit with the shafts 158 of the end pieces 150. It should be noted that the notch 182 and tabs 184 of side wall 172 only are shown in FIGS. 19 and 21, with the understanding being that the construction and location of the notches and tabs for side wall 174 are identical.

Figure 15:
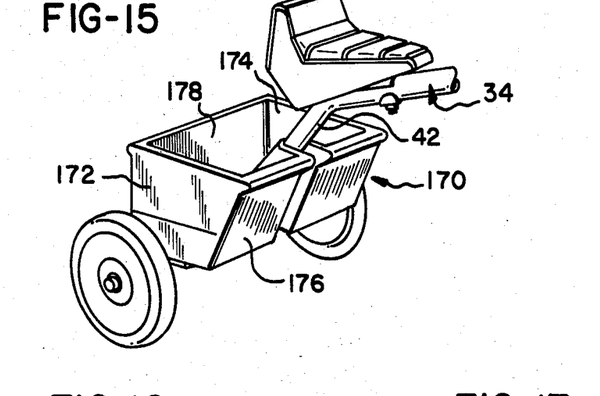
FIG. 15 is a detail showing an alternate embodiment of the tricycle of FIG. 1 in which a dumpster is attached to the rear portion thereof.
Figure 16:
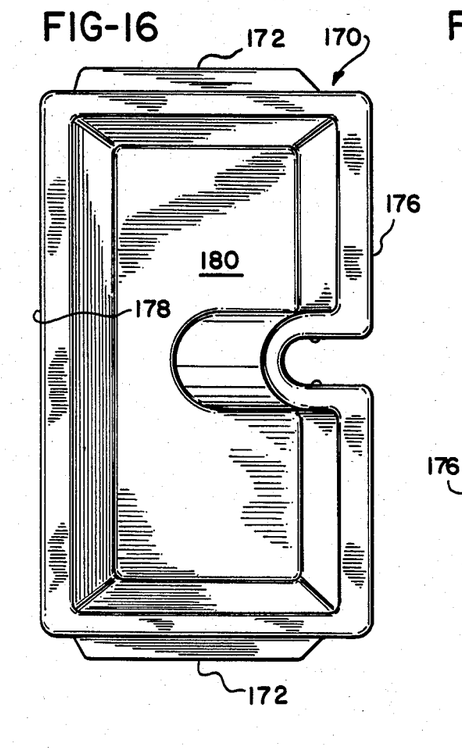
FIG. 16 is a top plan view of the dumpster of FIG. 15.
Figure 17:
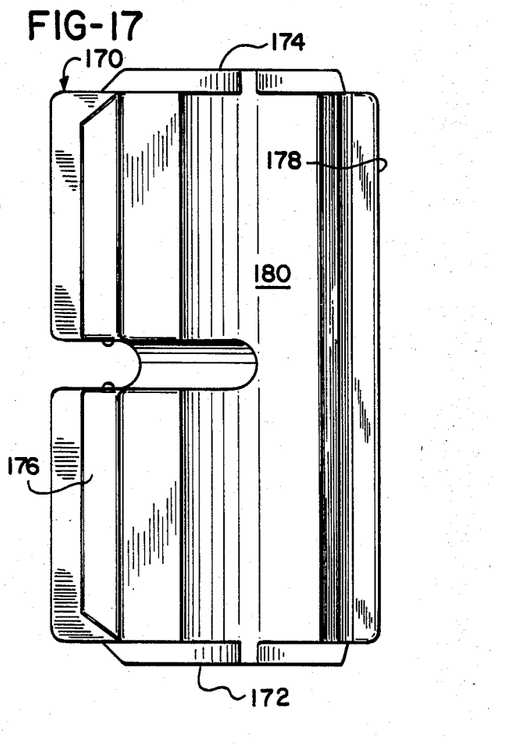
FIG. 17 is a bottom plan view of the dumpster of FIG. 15.
Figure 18:
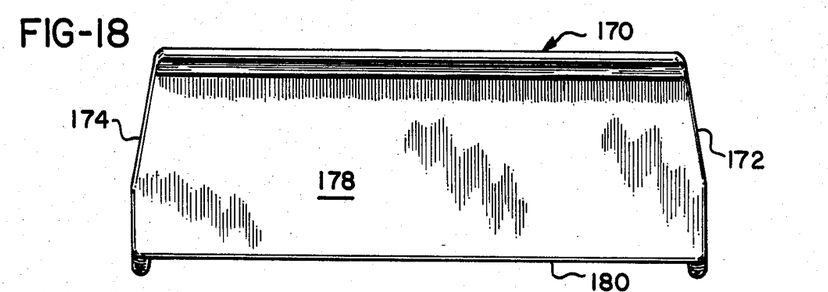
FIG. 18 is a rear elevation of the dumpster of FIG. 15, taken at line 18—18 of FIG. 19.

The front wall 176 of the dumpster 170 includes a channel 186 which is inclined upwardly from the floor 180 at a slope which is substantially the same as that of the rear segment 44 of the main tube 34 (see FIG. 15). The channel 186 includes a pair of opposing protrusions 188 which extend into the channel and are shaped to form a snap fit with the rear segment 42.

As shown in FIG. 21, the dumpster 170 is supported on the rear axle 37 in a load carrying position in which the rear segment 41 extends through the channel 186 and is held therein by a snap fit. The dumpster 170 can be pivoted rearwardly to the position 170' shown in FIG. 21 by a force applied in a direction rearward of the tricycle, thereby pivoting the dumpster 170 about the rear axle 37 and removing the channel 186 from its engagement with the rear segment 42 of the main tube 34.

In the preferred embodiment, the notches 182 formed in the side walls 172, 174 are positioned rearwardly of the center of gravity 189 of the dumpster 170 (see Fig. 19). Consequently, when mounted on the rear axle 37, the dumpster 170 has a tendency to pivot forwardly against the rear segment 41. This feature reduces the likelihood of the dumpster tipping inadvertently.

When used with the tricycle shown in FIG. 1, it is also preferable to provide a floor 180 as shown in Fig. 21. Such a floor includes an arcuate recess 190 in its underside shaped to provide clearance for the flange plates 152 of the end pieces 150.

While the forms of apparatus herein described constitute preferred embodiments of this invention, it is to be understood that the invention is not limited to these precise forms of apparatus, and that changes may be made therein without departing from the scope of the invention.

What is claimed is:

1. For use with a tricycle of the type having front and rear wheel means, and a main tube extending therebetween, an adjustable seat comprising:
    a seat body having a substantially flat seating surface;
    seat bracket means attached to said seat body and including a leg portion inclined upwardly relative to said seating surface;
    mounting bracket means having a front member shaped to matingly engage a main tube of a tricycle, and a rear member inclined relative to said front member and shaped to matingly engage said leg portion, said rear member inclined such that said seating surface is substantially horizontal when said front member is mounted on a main tube;
    means for adjustably mounting said front member on a main tube such that said mounting bracket and said seat body may be selectively attached in a forward or rearward position thereon; and
    means for adjustably attaching said leg portion to said rear member such that the elevation of said seat body may be selectively varied relative to a main tube and said seating surface is maintained substantially horizontal at all elevations.

2. The seat of claim 1 wherein said mounting means comprises said front member being elongate in shape and having a plurality of holes therethrough spaced longitudinally therealong; bolt means shaped to extend through a selected one of said holes and having a length sufficient to extend therethrough and through a hole in a main tube such that an end of said bolt means protrudes from an opposite side of an associated main tube; and nut means threaded on said end of said bolt means to clamp said front member against a main tube.

3. The seat of claim 2 wherein said adjustable attaching means comprises said leg portion having a plurality of slots therethrough and spaced therealong; said rear member having a plurality of holes spaced therealong and positioned such that said rear member holes may be moved selectively into registry with ones of said leg portion slots as said seat body and seat bracket are raised and lowered relative to said mounting bracket; bolt means shaped to extend through ones of said holes and slots in registry; and nut means threaded on said bolt means for clamping said leg portion to said rear member.

4. The seat of claim 3 wherein said leg portion is channel-shaped having opposing flanges including said leg portion holes; and said rear member is channel-shaped and sized to slide between said leg portion flanges, said rear member having opposing flanges including said rear member holes, such that said bolt means extends transversely of said leg portion and said rear member, and through selected holes of said flanges of said leg portion and said rear member.

5. In a tricycle of the type having front and rear wheel means, and a main tube extending therebetween, an adjustable seat comprising:
a seat body having a substantially flat seating surface;
seat bracket means attached to said seat body and including a leg portion inclined upwardly relative to said seating surface;
mounting bracket means having a front member shaped to matingly engage an upper surface of said main tube, and a rear member inclined relative to said front member and shaped to matingly engage said leg portion, said rear member inclined such that said seating surface is substantially horizontal when said front member is mounted on a main tube;
means for adjustably mounting said front member on said main tube such that said mounting bracket and said seat body may be selectively attached in a forward or rearward position thereon; and
means for adjustably attaching said leg portion to said rear member such that the elevation of said seat body may be selectively varied relative to a main tube and said seating surface is maintained substantially horizontal at all elevations.

6. The tricycle of claim 5 wherein said mounting means comprises said front member being elongate in shape and having a plurality of holes therethrough spaced longitudinally therealong; said main tube having a hole extending vertically therethrough; bolt means sized to extend through a selected one of said holes and through said main tube hole such that an end of said bolt means protrudes from a lower side of said main tube; and nut means threaded on said end of said bolt means to clamp said front member against said main tube.

7. The tricycle of claim 5 wherein said adjustable attaching means comprises said leg portion having a plurality of slots therethrough and spaced therealong; said rear member having a plurality of holes spaced therealong and positioned such that said rear member holes may be moved selectively into registry with ones of said leg portion slots as said seat body and seat bracket are raised and lowered relative to said mounting bracket; bolt means shaped to extend through ones of said holes and slots in registry; and nut means threaded on said bolt means for clamping said leg portion to said rear member.

8. The tricycle of claim 7 wherein said leg portion is channel-shaped having opposing flanges including said leg portion holes; and said rear member is channel-shaped and sized to slide between said leg portion flanges, said rear member having opposing flanges including said rear member holes such that said bolt means extends transversely of said leg portion and said rear member, and through selected holes of said flanges of said leg portion and said rear member.

* * * * *